United States Patent
Muramatsu

(10) Patent No.: US 8,401,228 B2
(45) Date of Patent: Mar. 19, 2013

(54) AUTOFOCUS USING OBJECT TRACKING BASED ON ADAPTIVE TEMPLATE MATCHING RANGE

(75) Inventor: Keiko Muramatsu, Tokyo (JP)

(73) Assignee: Nikon Corporation, Tokyo (JP)

( * ) Notice: Subject to any disclaimer, the term of this patent is extended or adjusted under 35 U.S.C. 154(b) by 1252 days.

(21) Appl. No.: 12/141,537

(22) Filed: Jun. 18, 2008

(65) Prior Publication Data

US 2009/0010549 A1 Jan. 8, 2009

(30) Foreign Application Priority Data

Jul. 4, 2007 (JP) ................................. 2007-175750

(51) Int. Cl.
*G06K 9/00* (2006.01)
*G03B 13/00* (2006.01)

(52) U.S. Cl. .................... 382/103; 348/208.14; 348/350; 348/352

(58) Field of Classification Search ........................ None
See application file for complete search history.

(56) References Cited

U.S. PATENT DOCUMENTS

| | | | | |
|---|---|---|---|---|
| 5,481,622 A | * | 1/1996 | Gerhardt et al. | 382/103 |
| 5,512,974 A | * | 4/1996 | Abe et al. | 396/153 |
| 5,808,695 A | * | 9/1998 | Rosser et al. | 348/584 |
| 6,031,568 A | * | 2/2000 | Wakitani | 348/169 |
| 6,867,799 B2 | * | 3/2005 | Broemmelsiek | 348/169 |
| 6,944,331 B2 | * | 9/2005 | Schmidt et al. | 382/165 |
| 2004/0004670 A1 | * | 1/2004 | Yamashita | 348/345 |
| 2005/0264679 A1 | | 12/2005 | Sasaki et al. | |
| 2006/0023914 A1 | * | 2/2006 | Gold | 382/103 |
| 2006/0210260 A1 | * | 9/2006 | Yata | 396/147 |
| 2007/0188629 A1 | * | 8/2007 | Nakabe et al. | 348/231.3 |

FOREIGN PATENT DOCUMENTS

| | | |
|---|---|---|
| JP | 6-83963 | 3/1994 |
| JP | 2006-258944 | 9/2006 |

* cited by examiner

*Primary Examiner* — Barry Drennan
(74) *Attorney, Agent, or Firm* — Ditthavong Mori & Steiner, P.C.

(57) ABSTRACT

An image recognition device includes a detection unit which is configured to detect a first difference between at least a part of the first image information and the reference information, a second difference between at least a part of the second image information and the reference information, and a third difference between at least a part of the third image information and the reference information. A recognition unit is configured to make a first determination whether the first difference is within a predetermined range, and to make a second determination whether the second difference is within the predetermined range. A changing unit is configured to change the predetermined range based on the first and second determinations. The recognition unit is configured to recognize an area corresponding to the reference image in the third image information based on the third difference and the predetermined range which has been changed.

25 Claims, 13 Drawing Sheets

AUTOFOCUS USING OBJECT TRACKING BASED ON ADAPTIVE TEMPLATE MATCHING RANGE

CROSS-REFERENCE TO RELATED APPLICATIONS

The present application claims priority under 35 U.S.C. §119 to Japanese Patent Application No. 2007-175750, filed Jul. 4, 2007. The contents of this application are incorporated herein by reference in their entirety.

BACKGROUND OF THE INVENTION

1. Field of the Invention

The present invention relates to an image recognition device, a focus adjustment device, an imaging apparatus, an image recognition method, and a focus adjustment method.

2. Discussion of the Background

There is known an image tracking device for storing an image of a target to be focused as a reference image (template image), detecting an image that matches the reference image from repeatedly photographed images through template matching process, and tracking the target (see, for example, Japanese Laid-Open Patent Publication No. 2006-058431). In this device, the reference image is updated with the image that matches the reference image among the photographed images when determined that one part of the photographed image matches the reference image.

In the conventional image tracking device described above, however, when photographing a scene in which the tracking target approaches the camera, the size of the tracking target in the screen becomes larger as the tracking target approaches the camera, and an update delay of the reference image (template image) occurs when the movement speed of the tracking target is fast, whereby determination might be made that the image of the tracking target does not match the reference image although the target is being tracked.

SUMMARY OF THE INVENTION

According to one aspect of the present invention, an image recognition device includes an imaging unit, a holding unit, a detection unit, a recognition unit, and a changing unit. The imaging unit is configured to acquire first image information, second image information, and third image information. The holding unit is configured to hold reference information that functions as a reference image. The detection unit is connected to the holding unit and is configured to detect a first difference between at least a part of the first image information and the reference information, detect a second difference between at least a part of the second image information and the reference information, and detect a third difference between at least a part of the third image information and the reference information. The recognition unit is connected to the detection unit and is configured to make a first determination whether or not the first difference is within a predetermined range, and is configured to make a second determination whether or not the second difference is within the predetermined range. The changing unit is connected to the recognition unit and is configured to change the predetermined range based on the first determination and the second determination. The recognition unit is configured to recognize an area corresponding to the reference image in the third image information based on the third difference and the predetermined range which has been changed.

According to another aspect of the present invention, a focus adjustment device in the image recognition device in which the imaging unit is configured to acquire the third image information from the first image information through an optical system includes a focus detection unit, a selection unit and a focus adjustment unit. The focus detection unit is configured to detect a focus state of the optical system at a plurality of detection areas provided in a screen of the optical system. The selection unit is connected to the focus detection unit and configured to select at least one of the plurality of detection areas based on a recognition performed by the recognition unit and a detection performed by the focus detection unit. The focus adjustment unit is configured to perform focus adjustment of the optical system based on the focus state detected by the focus detection unit with respect to the at least one of the plurality of detection areas selected by the selection unit.

According to yet another aspect of the present invention, an imaging apparatus includes the focus adjustment device.

According to further aspect of the present invention, an image recognition method includes acquiring first image information, second image information, and third image information, holding reference information that functions as a reference image, detecting a first difference between at least a part of the first image information and the reference information, making a first determination whether or not the first difference is within a predetermined range, detecting a second difference between at least a part of the second image information and the reference information, making a second determination whether or not the second difference is within the predetermined range, changing the predetermined range based on the first determination and the second determination, detecting a third difference between at least a part of the third image information and the reference information, and recognizing an area corresponding to the reference image in the third image information based on the third difference and the predetermined range which has been changed.

According to the other aspect of the present invention, a focus adjustment method in the image recognition method, the focus adjustment method includes acquiring the third image information from the first image information through an optical system, detecting a focus state of the optical system at a plurality of detection areas provided in a screen of the optical system, selecting at least one detection area among the plurality of detection areas based on the focus state and the area recognized as corresponding to the reference image, and performing focus adjustment of the optical system based on the focus state of the at least one detection area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
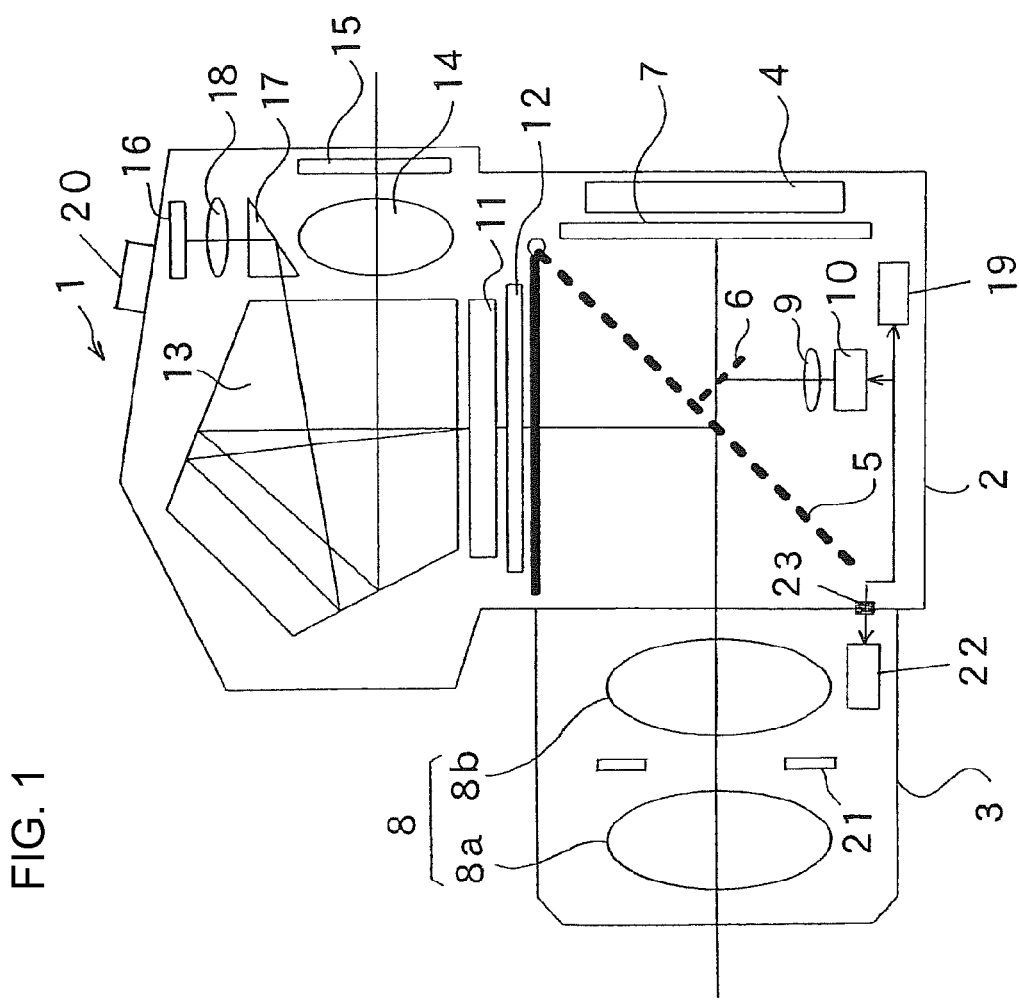
FIG. 1 is a view showing a configuration of an imaging apparatus equipped with an image recognition device according to one embodiment of the present invention.

The embodiments will now be described with reference to the accompanying drawings, wherein like reference numerals designate corresponding or identical elements throughout the various drawings.

According to the embodiments of the present invention, the similarity determination threshold value corresponding to the photographing scene can be set, and similarity determination between the imaged image and the reference image can be accurately performed.

One embodiment of an imaging apparatus (single-lens reflex digital still camera) having an automatic focus adjustment (AF) function of detecting a focus adjustment state (defocus amount in the embodiment) of a photographing lens at a plurality of focus detection areas set within a photographing screen and focus driving the photographing lens based on the defocus amount of one of the areas, and an image tracking function of storing an image of a subject to be tracked in the photographing images as a template image (reference image) and tracking the subject to be tracked while searching for a position of the image same as or similar to the template image of the repeatedly photographed images (template matching), and being equipped with an image recognition device for tracking the target while driving the photographing lens with the AF function and the image tracking function will be described.

FIG. 1 shows a configuration of the imaging apparatus (single-lens reflex digital still camera) 1 equipped with the image recognition device according to one embodiment. In FIG. 1, illustration and description are not given to equipment and circuits of the camera not directly related to the embodiment of the present invention. The camera 1 according to one embodiment has an interchangeable lens 3 attached to a camera body 2 in an interchangeable manner. A first imaging element 4 for imaging a subject image and recording the image is arranged in the camera body 2. The first imaging element 4 is configured by CCD, CMOS, and the like. In time of photographing, a quick return mirror 5 and a sub-mirror 6 evacuate to a position outside a photographing optical path shown with a solid line, and a shutter 7 is opened, so that the subject image is imaged on a light receiving surface of the first imaging element 4 by a photographing lens 8.

A focus detection optical system 9 and a distance measuring element 10 for detecting the focus adjustment state of the photographing lens 8 are arranged at the bottom of the camera body 2. In the embodiment, an example of adopting a focus detection method by an eye division phase difference detection system is shown. The focus detection optical system 9 guides a pair of focus detection light fluxes passed through the photographing lens 8 to a light receiving surface of the distance measuring element 10, and images a pair of optical images. The distance measuring element 10 includes a pair of CCD line sensors, and the like, and outputs a focus detection signal corresponding to the pair of optical images. The quick return mirror 5 and the sub-mirror 6 are set at a position in the photographing optical path as shown with a broken line before photographing, where the pair of focus detection light fluxes from the photographing lens 8 are transmitted through a half mirror part of the quick return mirror 5, reflected by the sub-mirror 6, and guided to the focus detection optical system 9 and the distance measuring element 10.

A finder optical system is arranged at the upper part of the camera body 2. The quick return mirror 5 and the sub-mirror 6 are at a position shown with a broken line before photographing, where the subject light from the photographing lens 8 is reflected by the quick return mirror 5 and guided to a focusing plate 11 so that the subject image is imaged on the focusing plate 11. A liquid crystal display element 12 displays information such as focus detection area mark in a superimposed manner on the subject image imaged on the focusing plate 11, and also displays various photographing information such as exposure value at a position outside the subject image. The subject image on the focusing plate 11 is guided to an eyepiece window 15 through a pentagonal roof prism 13 and an eyepiece lens 14, so that the photographer can visually recognize the subject image.

A second imaging element 16 for imaging the subject image for subject tracking or photometry is arranged in the finder optical system at the upper part of the camera body 2. The subject image imaged on the focusing plate 11 is re-imaged on a light receiving surface of the second imaging element 16 through the pentagonal roof prism 13, a prism 17, and an imaging lens 18. The second imaging element 16 outputs an image signal corresponding to the subject image. The subject image imaged on the focusing plate 11 before photographing is guided to the second imaging element 16 through the pentagonal roof prism 13, the prism 17, and the imaging lens 18, and the subject image is re-imaged on the light receiving surface of the second imaging element 16. The details will be described later, where the tracking control and the exposure calculation are performed based on the subject image imaged by the second imaging element 16.

A body drive control device 19, an operation member 20, and the like are arranged in the camera body 2. The body drive control device 19 is configured by a microcomputer, peripheral components such as memory and A/D converter, and the like to be described later in detail, and performs various controls and calculations of the camera 1. The operation member 20 includes switches and selectors for operating the camera 1 such as shutter button, focus detection area selection switch, photographing mode selection switch, and the like.

A zooming lens 8a, a focusing lens 8b, an aperture 21, a lens drive control device 22, and the like are arranged in the interchangeable lens 3. In the embodiment, the photographing lens 8 is representatively indicated with the zooming lens 8a, the focusing lens 8b, and the aperture 21, but the configuration of the photographing lens 8 is not limited to the configuration shown in FIG. 1. The lens drive control device 22 is configured by a microcomputer, peripheral components such as memory, drive circuit, and actuator, and the like (not shown), and performs drive control of the lenses 8a, 8b and the aperture 21 and the setting position detection thereof.

Information such as focal length and opening aperture value of the interchangeable lens 3 are stored in the memory built in the lens drive control device 22.

The body drive control device 19 and the lens drive control device 22 communicate through a contact point 23 of a lens mount unit, where information such as lens driving amount and aperture value are transmitted from the body drive control device 19 to the lens drive control device 22, and lens information and aperture information are transmitted from the lens drive control device 22 to the body drive control device 19.

Figure 2:
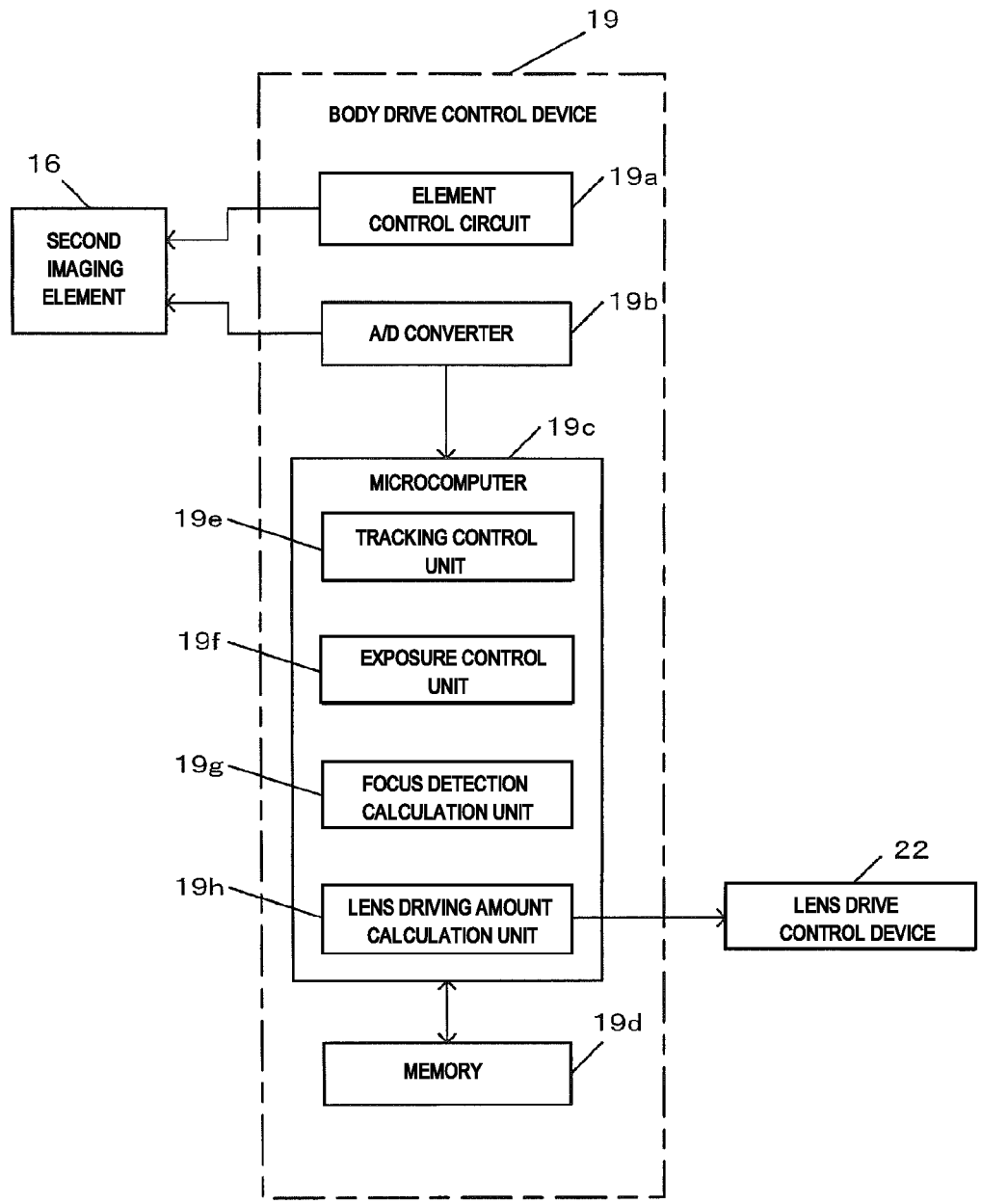
FIG. 2 is a view showing a detailed configuration of a body drive control device.

FIG. 2 shows a detailed configuration of the body drive control device 19. Illustration and description are not given to the control functions not directly related to the embodiment of the present invention. The body drive control device 19 includes an element control circuit 19a, an A/D converter 19b, a microcomputer 19c, a memory 19d, and the like. The element control circuit 19a controls accumulation and readout of charges of the second imaging element 16. The A/D converter 19b converts an analog image signal output from the second imaging element 16 to a digital image signal. The microcomputer 19c configures, in software form, a tracking control unit 19e, an exposure control unit 19f, a focus detection calculation unit 19g, and a lens driving amount calculation unit 19h. The memory 19d stores information such as template image for image tracking and defocus amount, or lens information such as focal length, opening F value, aperture value, and conversion coefficient from image shift amount to defocus amount of the photographing lens 8.

The tracking control unit 19e stores the image corresponding to the tracking target position manually specified by the photographer or the tracking target position automatically set by the camera 1 of the subject image imaged by the second imaging element 16 as a template image (reference image) in the memory 19d, and searches the image region that matches or is similar to the template image from the subsequently repeatedly photographed images to recognize the position of the target. The exposure calculation unit 19f calculates an exposure value based on the image signal imaged by the second imaging element 16.

The focus detection calculation unit 19g detects the focus adjustment state, or defocus amount herein, of the photographing lens 8 based on the focus detection signal corresponding to the pair of optical images output from the distance measuring element 10. The details will be described later, but a plurality of focus detection areas is set within the photographing screen of the photographing lens 8, the distance measuring element 10 outputs the focus detection signal corresponding to the pair of optical images for every focus detection area, and the focus detection calculation unit 19g detects the defocus amount based on the focus detection signal corresponding to the pair of optical images for every focus detection area. The lens driving amount calculation unit 19h converts the detected defocus amount to the lens driving amount.

Figure 3:
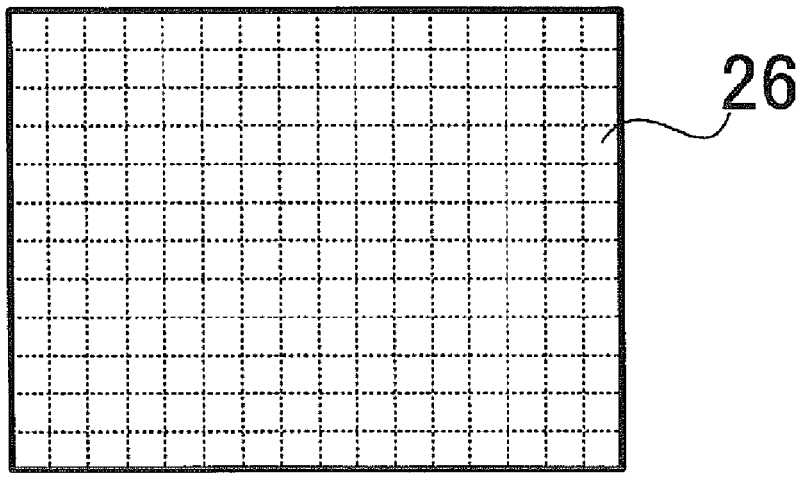
FIG. 3 is a front view showing a detailed configuration of a second imaging element.
Figure 4:
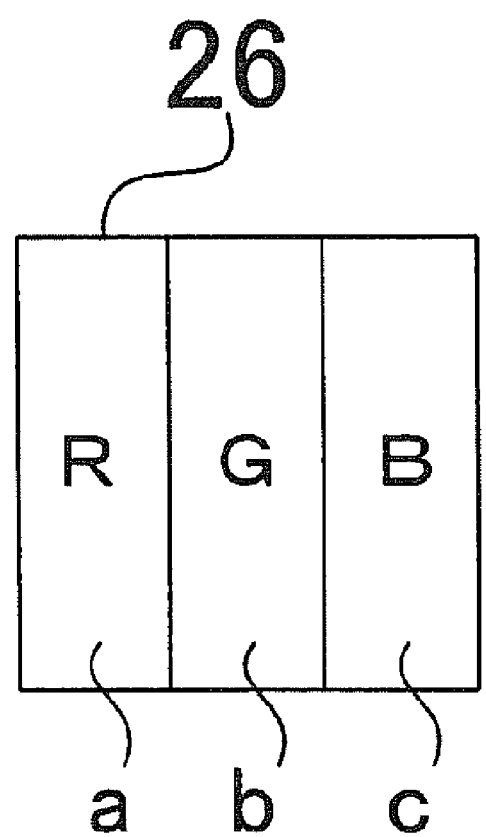
FIG. 4 is a detailed view of a pixel of the second imaging element.

FIG. 3 is a front view showing a detailed configuration of the second imaging element 16. The second imaging element 16 includes a plurality of (26 herein, 16×12=192) pixels (photoelectric conversion elements) arrayed in a matrix form. As shown in FIG. 4, each pixel 26 is divided into three portions 26a, 26b, and 26c, and a primary color filter of red R, green G, and blue B is arranged in the respective portions 26a, 26b, and 26c. Thus, the RGB signal of the subject image can be output for every pixel 26.

Figure 5:
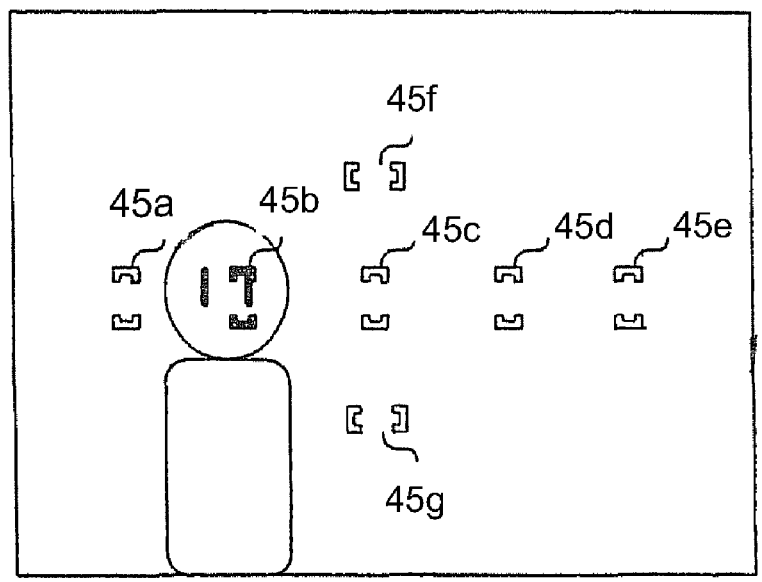
FIG. 5 is a view showing an arrangement of a focus detection area in a photographing screen.
Figure 6A:
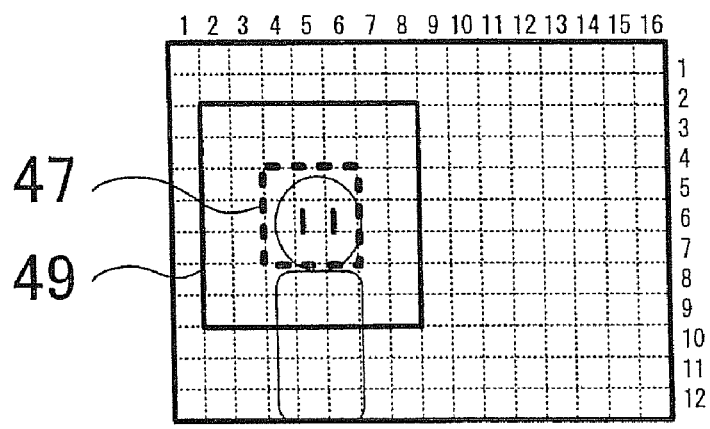
FIG. 6 is a view describing a subject tracking method according to one embodiment of the present invention.
Figure 6B:
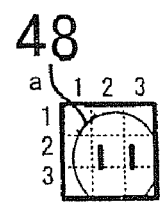
Figure 7B:
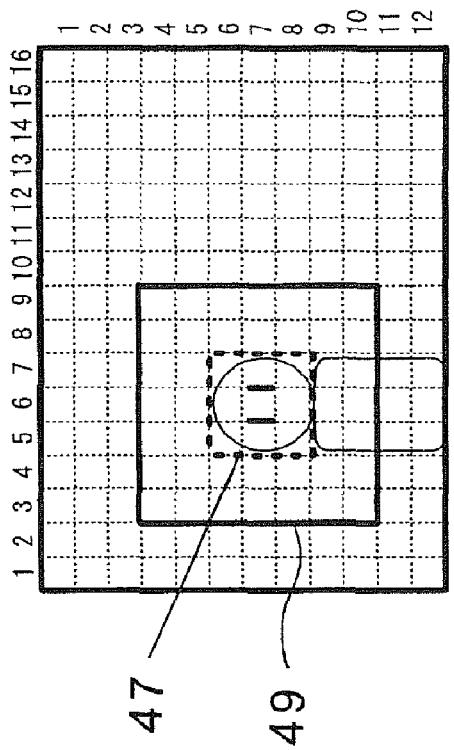
FIG. 7 is a view describing the subject tracking method according to one embodiment of the present invention.
Figure 7A:
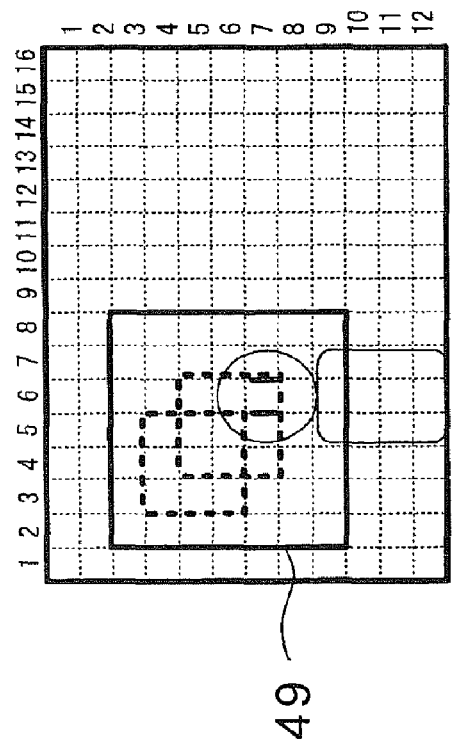
Figure 8:
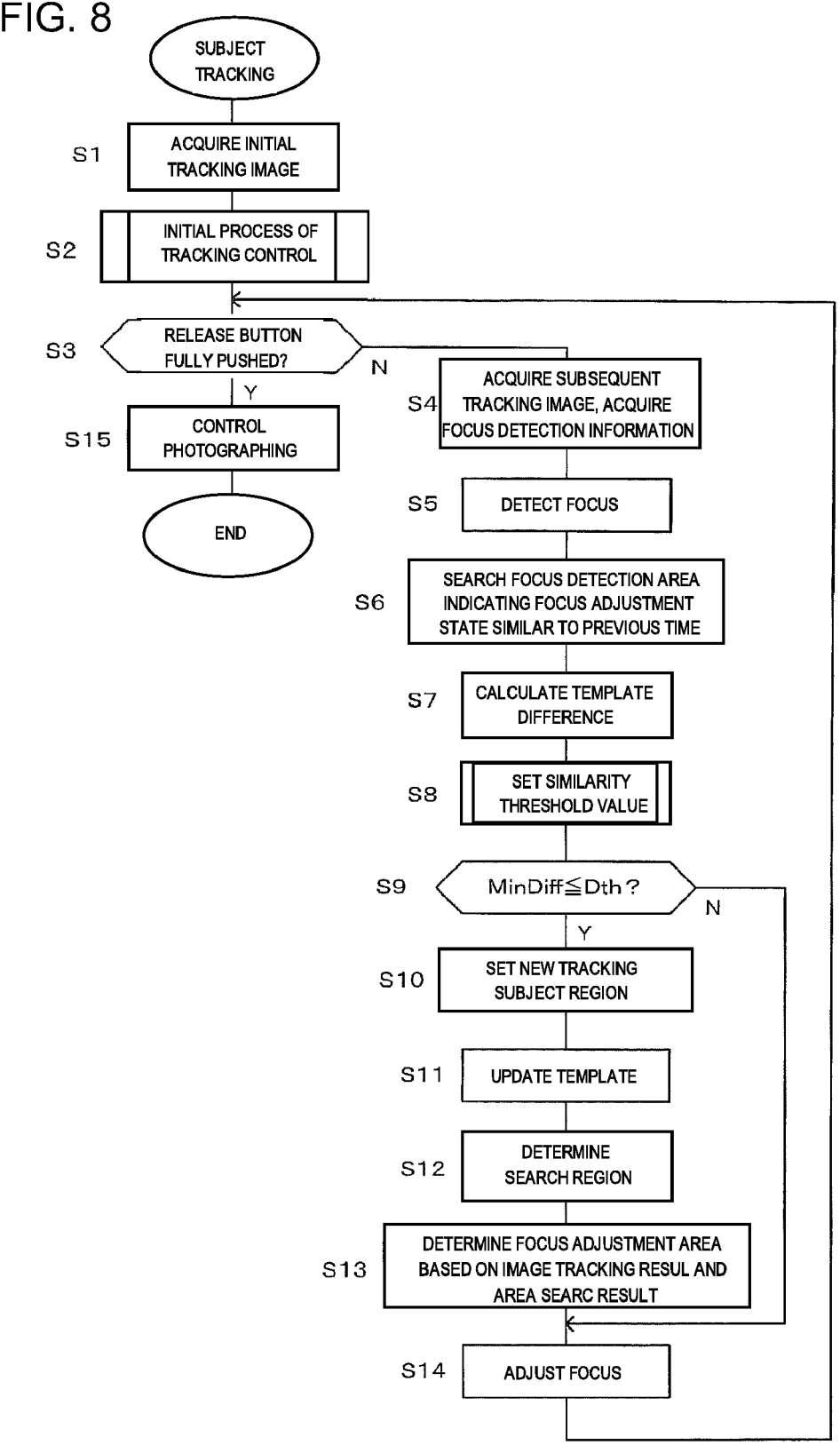
FIG. 8 is a flowchart showing a subject tracking operation according to one embodiment of the present invention.
Figure 9:
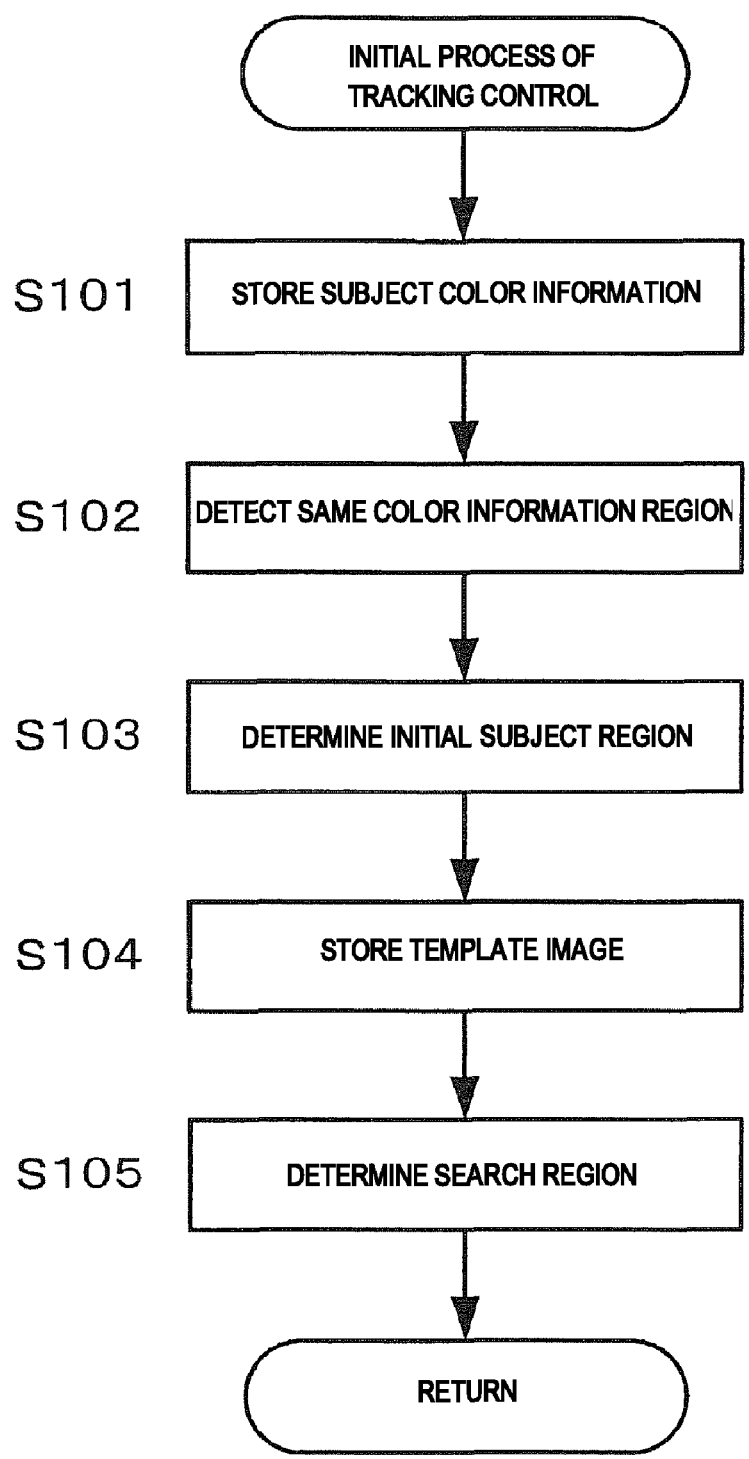
FIG. 9 is a flowchart showing an initial process of tracking control according to one embodiment of the present invention.
Figure 10:
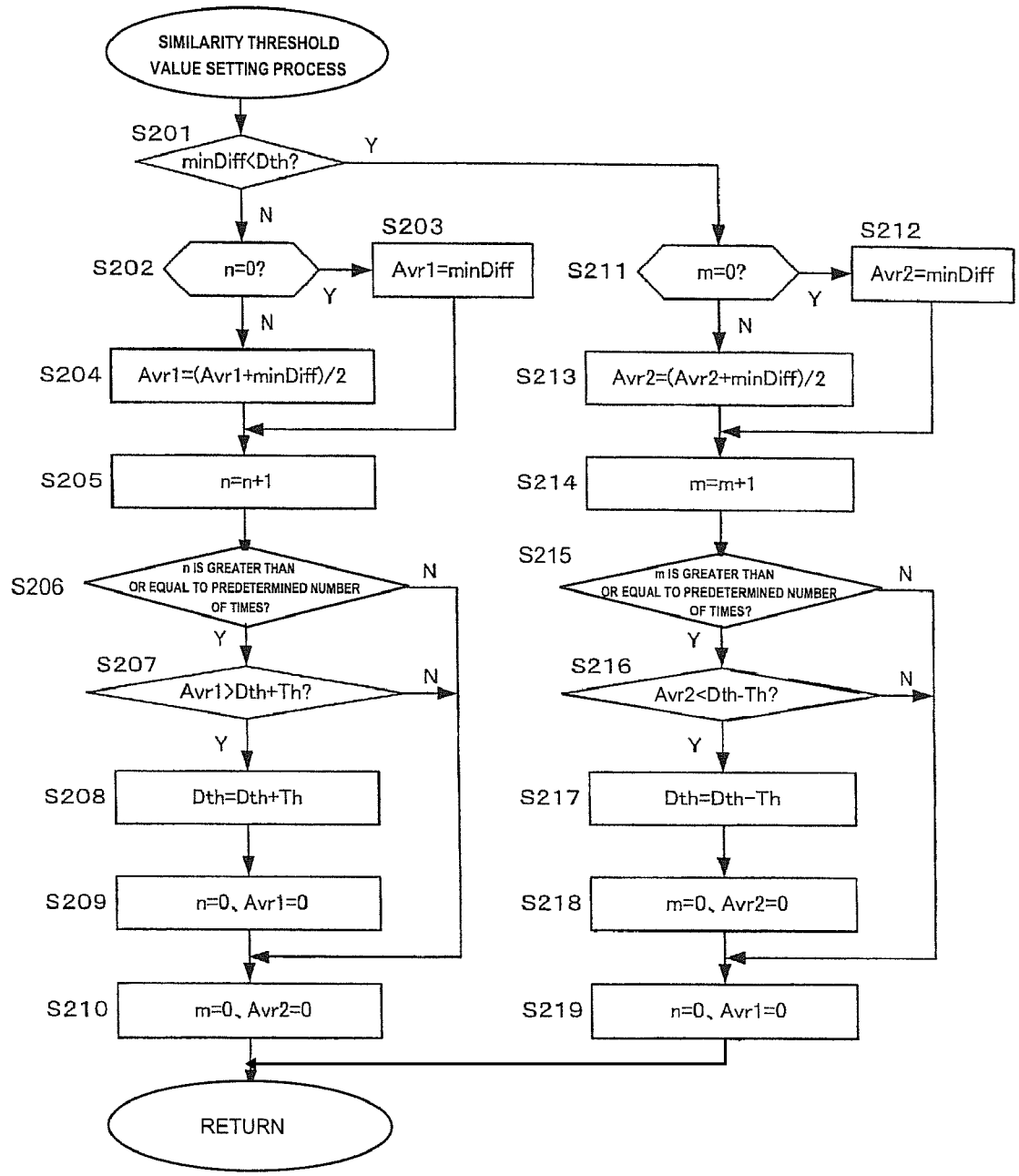
FIG. 10 is a flowchart showing a similarity threshold value setting process according to one embodiment of the present invention.

The subject tracking operation according to one embodiment will now be described. FIG. 5 to FIG. 7 are views describing the subject tracking method according to one embodiment, and FIG. 8 to FIG. 10 are flowcharts showing the subject tracking process according to one embodiment. Other than when the shutter button is fully pushed to carry out photographing, the quick return mirror 5 is set within the photographing optical path shown with a broken line in FIG. 1, and the subject light entered from the photographing lens 8 is imaged on the focusing plate 11. The subject image on the focusing plate 11 is guided to the second imaging element 16 through the pentagonal roof prism 13, the prism 17, and the imaging lens 18, and the subject image signal is repeatedly output from the second imaging element 16.

A plurality of focus detection areas is set in the photographing lens 8, where an area mark is superimposed on the subject image on the focusing plate 11 by the liquid crystal display element 12, and the position of each focus detection area is displayed. In one embodiment, an example where the focus detection areas 45a to 45g are set at seven locations within the photographing screen is shown, as shown in FIG. 5. The mark of the relevant area is lighting displayed when an arbitrary area is selected by the focus detection area selection switch of the operation member 20.

As shown in FIG. 5, when the focus detection area 45b is selected by the focus detection area selection switch of the operation member 20, and the shutter button of the operation member 20 is half-pushed in this state, the focus detection area 45b is stored in the memory 19d as an initial AF area. The subject to be tracked is thereby specified. An example in which the photographer selects the initial AF area and manually specifies the subject to be tracked has been shown, but the initial AF area and the subject to be tracked may be set based on subject recognition result in a camera having a function of automatically recognizing the subject.

In step 1, an initial tracking image (firstly acquired image after the image tracking process is started) is acquired by the second imaging element 16. The initial tracking image is represented in RGB value for every pixel.

$$R[x,y], G[x,y], B[x,y] \tag{1}$$

The color information RG, BG of each pixel are calculated based on the RGB value of every pixel, and the luminance information L is calculated from the exposure time T, the gain Gain, and the color combining coefficients Kr, Kg, and Kb for a case where the image is acquired.

$$RG[x,y]=\text{Log}_2(R[x,y])-\text{Log}_2(G[x,y]),$$

$$RG[x,y]=\text{Log}_2(B[x,y])-\text{Log}_2(G[x,y]),$$

$$L[x,y]=\text{Log}_2(Kr \times R[x,y]+Kg \times G[x,y]+Kb \times B[x,y])- \text{Log}_2(T)-\text{Log}_2(\text{Gain}) \tag{2}$$

In the following step 2, the initial process of tracking control shown in FIG. 9 is executed. In step 101 of FIG. 9, the image of the position corresponding to the position of the focus detection area 45b in the initial tracking image acquired in the second imaging element 16 is stored as subject color information. In step 102, same color information region indicating the color information similar to the subject color information is detected at the periphery of the position of the focus detection area 45b (see FIG. 5) in the initial tracking image, and in the subsequent step 103, the same color information region is determined as the initial tracking subject region 47.

An example of determining the tracking subject region 47 based on the subject color information is shown, where the size of the tracking subject region may be unified such as 3×3 to simplify the process, or the size of the subject region may be determined according to the distance information of the photographing lens 8.

In step 104, the image of the tracking subject region 47 in the initial tracking image is stored in the memory 19d as a template image 48 (see FIG. 6(*b*)) used in the image tracking process. For instance, when the starting point position of the tracking subject region 47 is (x, y)=(4, 5) as shown in FIG. 6(*a*), the color information of the template image 48 is expressed as below.

RGref[rx,ry]=RG[x,y],

BGref[rx,ry]=BG[x,y],

Lref[rx,ry]=L[x,y] (rx,ry=1 to 3, x=4 to 6, y=5 to 7)  (3)

Next, a region enlarged by a predetermined pixel (two pixels herein) towards the front, the back, the left, and the right with the tracking subject region 47 as the center is set as a search region 49 in step 105. In the example shown in FIG. 6(*a*), the search region 49 is a region of x=2 to 8, y=3 to 9.

After the initial process of tracking control is terminated, the process proceeds to step 3 of FIG. 8, and whether or not the shutter button of the operation member 20 is completely pushed, that is, whether or not the shutter release operation is performed is checked. When the shutter release operation is not made, the process proceeds to step 4, and the subsequent tracking image is acquired from the second imaging element 16 and the color information RG[x, y], BG[x, y] and the luminance information L[x, y] are calculated and stored in the memory 19*d*, similar to the process of step 1. Simultaneously, the focus detection signal corresponding to the pair of optical images for focus detection is acquired for every one of focus detection areas 45*a* to 45*g* by the distance measuring element 10.

In step 5, the focus adjustment state, that is, the defocus amount of the photographing lens 8 of each one of selected focus detection areas 45*a* to 45*g* is detected based on the focus detection signal acquired in step 4. In step 6, a focus detection area indicating the defocus amount similar to the defocus amount of the focus detection area used in the previous focus adjustment is searched from the defocus amounts of all the focus detection areas.

In step 7, the region of the same size as the template image 48 is sequentially cut out from the search region 49 in the subsequent tracking image, and the difference Diff in color information is calculated for every corresponding pixel of the cutout image and the template image 48. As shown with a thick broken line in FIG. 7(*a*), the difference Diff in color information with the template image 48 is calculated while shifting the region by one pixel in the search region 49.

When the starting point position of the search region 49 is (scx, scy)=(2, 3) as shown in FIG. 7(*a*), the calculation of the difference Diff is carried out in the following manner.

$$Diff[dx,dy]=\Sigma\Sigma\{ABS(RG[scx+dx-1+rx,scy+dy-1+ry]-RGref[rx,ry])+ABS(BG[scx+dx-1+rx,scy+dy-1+ry]-BGref[rx,ry])+ABS(L[scx+dx-1+rx,scy+dy-1+ry]-Lref[rx,ry])\}$$  (4)

In equation (4), dx, dy=1 to 5, rx, ry=1 to 3, scx=2, scy=3, and $\Sigma\Sigma$ is the summation calculation of rx=1 to 3 and ry=1 to 3.

The difference in which the value is a minimum is set as a minimum difference MinDiff of all the differences Diff calculated in equation (4). In the example shown in FIG. 7(*a*), the position (minx, miny) at which the minimum difference MinDiff is (4, 4) in the search region 49. The similarity with the template image is higher the smaller the value of the minimum difference MinDiff. In step 8, a similarity threshold value setting sub-routine shown in FIG. 10 is executed to set a similarity threshold value Dth.

In step 201 of FIG. 10, the minimum difference MinDiff is first compared with a current similarity threshold value Dth (initial value for the first time). The value at which a similarity determination can be appropriately carried out in the normal photographing scene is set for the initial value of the similarity threshold value Dth. The process proceeds to step 211 when the minimum difference MinDiff is smaller than the similarity threshold value Dth, and the process proceeds to step 202 when the minimum difference MinDiff is greater than or equal to the similarity threshold value Dth. First, the process for a case where the minimum difference MinDiff is greater than or equal to the similarity threshold value Dth will be described. In step 202, the value of a number of times counter n for counting the number of times the minimum difference MinDiff is continuously determined as greater than or equal to the similarity threshold value Dth is checked, and whether or not the value of the number of times counter n is 0, that is, whether or not the minimum difference MinDiff is determined as greater than or equal to the similarity threshold value Dth the first time is checked in the similarity threshold value setting sub-routine repeatedly executed in time of half-push operation of the shutter release.

When determined that the minimum difference MinDiff is greater than or equal to the similarity threshold value Dth for the first time, the process proceeds to step 203, and the minimum difference MinDiff for this time is set as an average value Avr1 of the minimum difference MinDiff for a case where the minimum difference MinDiff is continuously determined as greater than or equal to the similarity threshold value Dth. When the value of the number of times counter n is not 0, that is, when determined that the minimum difference MinDiff is greater than or equal to the similarity threshold value Dth continuously from the previous time, the process proceeds to step 204, and the minimum difference MinDiff for this time is added to the average value Avr1 and divided by two to update the average value Avr1.

In step 205, 1 is added to the value of the counter n to increment the counter, and in the subsequent step 206, whether or not the value of the number of times counter n is greater than or equal to a predetermined value is determined. When continuously determined that the minimum difference MinDiff is greater than or equal to the similarity threshold value Dth for greater than or equal to a predetermined number of times, the process proceeds to step 207, and whether or not the average value Avr1 is greater than the value obtained by adding a predetermined value Th to the similarity threshold value Dth is determined. When the average value Avr1 is greater than (Dth+Th), the process proceeds to step 208, and the predetermined value Th is added to the similarity threshed value Dth to reset the similarity threshold value Dth. In step 209 of after resetting the similarity threshold value Dth, the number of times counter n and the average value Avr1 are both reset to 0, and in the subsequent step 210, a number of times counter m and an average value Avr2 (described later in detail) are both reset to 0.

When determined that the number of times n the minimum difference MinDiff is determined as greater than or equal to the similarity threshold value Dth does not meet the predetermined number of times in step 206, or when the average value Avr1 is determined as smaller than or equal to (Dth+Th) in step 207, the process proceeds to step 210, and the number of times counter m and the average value Avr2 (described later in detail) are both reset to 0.

When determined that the minimum difference MinDiff is smaller than the similarity threshold value Dth in step 201, the value of the number of times counter m for counting the number of times the minimum difference MinDiff is continuously determined as smaller than the similarity threshold value Dth is checked, and whether or not the value of the number of times counter m is 0, that is, whether or not the minimum difference MinDiff is determined as smaller than the similarity threshold value Dth the first time is checked in the similarity threshold value setting sub-routine repeatedly executed in time of half-push operation of the shutter release.

When determined that the minimum difference MinDiff is smaller than the similarity threshold value Dth for the first time, the process proceeds to step 212, and the minimum difference MinDiff for this time is set as the average value Avr2 of the minimum difference MinDiff for a case where the minimum difference MinDiff is continuously determined as smaller than the similarity threshold value Dth. When the value of the number of times counter m is not 0, that is, when determined that the minimum difference MinDiff is smaller than the similarity threshold value Dth continuously from the previous time, the process proceeds to step 213, and the minimum difference MinDiff for this time is added to the average value Avr2 and divided by two to update the average value Avr2.

In step 214, 1 is added to the value of the counter m to increment the counter, and in the subsequent step 215, whether or not the value of the number of times counter m is greater than or equal to a predetermined value is determined. When continuously determined that the minimum difference MinDiff is smaller than the similarity threshold value Dth for greater than or equal to a predetermined number of times, the process proceeds to step 216, and whether or not the average value Avr2 is smaller than the value obtained by subtracting a predetermined value Th from the similarity threshold value Dth is determined. When the average value Avr2 is smaller than (Dth−Th), the process proceeds to step 217, and the predetermined value Th is subtracted from the similarity threshed value Dth to reset the similarity threshold value Dth. In step 218 of after resetting the similarity threshold value Dth, the number of times counter m and the average value Avr2 are both reset to 0, and in the subsequent step 219, the number of times counter n and the average value Avr1 are both reset to 0.

When determined that the number of times m the minimum difference MinDiff is determined as smaller than the similarity threshold value Dth does not meet the predetermined number of times in step 215, or when the average value Avr2 is determined as greater than or equal to (Dth−Th) in step 216, the process proceeds to step 219, and the number of times counter n and the average value Avr1 are both reset to 0.

Summarizing the similarity threshold value setting process described above, when the minimum difference MinDiff is continuously greater than the similarity threshold value Dth for greater than or equal to a predetermined number of times, the predetermined value Th is added to the similarity threshold value Dth to increase the similarity threshold value Dth. Thus, in the determining process of whether or not the image of the tracking target matches or is similar to the template image, the minimum difference MinDiff is smaller than the similarity threshold value Dth and determination on whether matching or being similar to the template image can be easily made, and the tracking of the target can be continued.

When the minimum difference MinDiff is continuously smaller than the similarity threshold value Dth for greater than or equal to a predetermined number of times, the predetermined value Th is subtracted from the similarity threshold value Dth to decrease the similarity threshold value Dth. Thus, in the determination process of whether or not the image of the tracking target matches or is similar to the template image, an inappropriately small similarity threshold value Dth is set, mistaken determination that the image different from the tracking target matches or is similar to the template image is prevented from being made, reset to an appropriate similarity threshold value Dth is carried out, and the reliability of image tracking can be enhanced.

In step 9 of FIG. 8 after setting the similarity threshold value, the minimum difference MinDiff is compared with the newly set similarity threshold value Dth, and whether or not the minimum difference MinDiff is smaller than or equal to the similarity threshold value Dth is determined. When the minimum difference MinDiff is smaller than or equal to the similarity threshold value Dth, the process proceeds to step 10, and a cutout region representing the minimum difference MinDiff is determined as the new tracking subject region 47. Here, as shown in FIG. 7(*b*), the cutout region having the starting point position of (x, y)=(5, 6) is determined as the new tracking subject region 47.

In the following step 11, the image information of the template image 48 is updated using the image information of the new tracking subject region 47. In this case, the recent image information is gradually updated on the image information of the template image by adding 20% of the image information of the new tracking subject region 47 with respect to 80% of the image information of the original template image 48, for example, so that change in the tracking subject can be easily followed.

Specifically, calculation of update is performed in the following manner.

$$RGref[rx,ry]=0.8 \times RGref[rx,ry]+0.2 \times RG[x,y],$$

$$BGref[rx,ry]=0.8 \times BGref[rx,ry]+0.2 \times BG[x,y],$$

$$Lref[rx,ry]=0.8 \times Lref[rx,ry]+0.2 \times L[x,y],$$

$$(rx,ry=1 \text{ to } 3, x=5 \text{ to } 7, y=6 \text{ to } 8) \quad (5)$$

The proportion in a case where updating the template image 48 between the image information of the template image up to now and the image information of the new tracking subject region 47 may be a fixed value, or may be changed according to the minimum difference MinDiff.

In step 12, a region enlarged by a predetermined pixel (two pixels in this case) towards the front, the back, the left, and the right with the new tracking subject region 47 as the center is set as the search region 49. As shown in FIG. 7(*b*), the region of x=3 to 9, y=4 to 10 is the search region 49.

In step 13, the area for performing focus adjustment is determined based on the new tracking subject region 47 of the image tracking result in step 10 and the focus detection area of the area search result by the AF function in step 12. In the embodiment, the focus detection area corresponding to the new tracking subject region 47 of the image tracking result and the focus detection area of the area search result by the AF function are compared, and a focus detection area common to the image tracking result and the area search result of the AF function is determined as the area for performing focus adjustment (hereinafter, referred to as focus adjustment area).

In step 14, the defocus amount detected in the focus adjustment area is converted to the lens driving amount, and the focusing lens 8*b* is driven by the lens drive control device 22 to perform focus adjustment.

When determined that the minimum difference MinDiff is greater than the similarity threshold value Dth in step 9, steps 10 to 13 are skipped. That is, in this case, the focus adjustment may be performed with the focus detection area of the area search result as the focus adjustment area assuming the image of the tracking subject that matches or is similar to the template image 48 is not found, or the focus adjustment for this time may be stopped. The full-pushing of the release button may be checked in step 3 after the focus adjustment. The processes of steps 4 to 14 are repeatedly executed while the shutter button is half-pushed, and the process proceeds to step 15 to execute the photographing process when the shutter button is fully pushed.

Figure 11B:
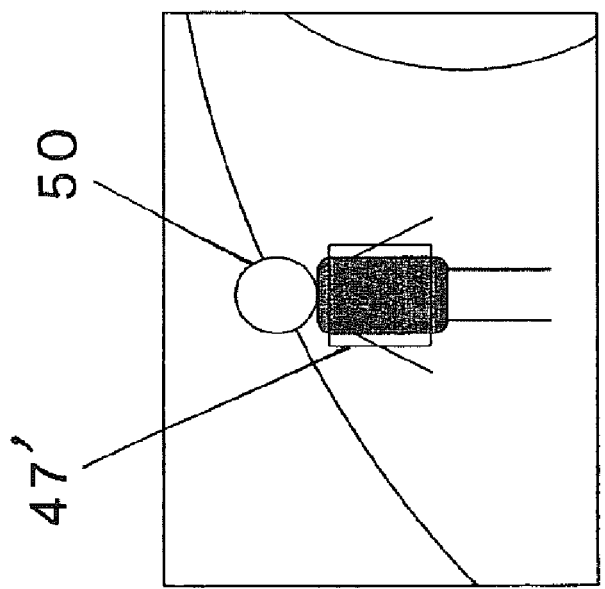
FIG. 11 is a view describing a subject tracking operation according to one embodiment of the present invention.
Figure 11A:
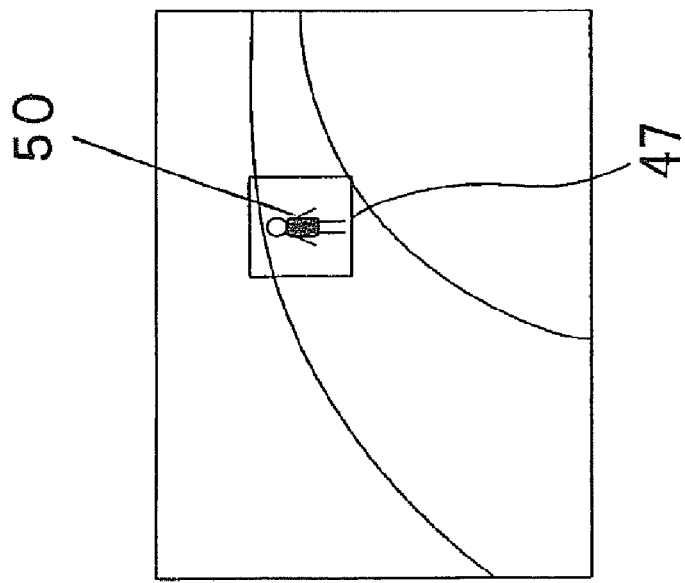

FIG. 11 shows a state in a case of performing tracking with the subject approaching the camera as the target. As shown in FIG. 11(*a*), the tracking subject region 47 is set when the tracking target 50 is distant from the camera, and when the tracking target 50 approaches the camera as shown in FIG. 11(*b*) after the tracking is started with the image information of the tracking subject region 47 as the template image, the image of the tracking target 50 is greatly enlarged and similarity determination cannot be carried out in the matching process with the template image. On the contrary, when the tracking subject region 47' is set when the tracking target 50 is at a position close to the camera, and the tracking target 50 moves away from the camera as shown in FIG. 11(*a*) after the tracking is started with the image information of the tracking subject region 47' as the template image, the image of the tracking target 50 is reduced, and similarly, similarity determination cannot be carried out in the matching process with the template image.

Thus, since the correlation between the photographing image and the template image changes according to change in the relative position of the tracking target and the camera, or change in the photographing target or the photographing scene, the similarity determination is difficult and image tracking cannot be continued or mistaken determination increases and the reliability of image tracking lowers when the similarity threshold value for performing similarity determination with the template image is set to a fixed value.

According to one embodiment, in image tracking of imaging the image imaged by the photographing lens 8, storing the image of the tracking target as the template image (reference image), calculating the difference Diff in color information of the imaged image and the template image (reference image) while shifting the position for comparing them, and determining the position of the template image of the imaged image in which the minimum difference MinDiff is produced as the new tracking subject region when the minimum difference MinDiff of the calculated differences Diff is determined to be smaller than the similarity threshold value, the similarity threshold value Dth is set based on the history of the minimum difference MinDiff, and thus the similarity determination threshold value corresponding to the photographing scene can be set and similarity determination between the imaged image and the reference image can be accurately performed. For instance, the image tracking performance can be enhanced even with the photographing scene in which the subject of the tracking target is approaching the camera.

According to one embodiment, when determined that the minimum difference MinDiff of the calculated differences Diff is smaller than the similarity threshold value, the template image is updated based on the image of the position in which the minimum difference MinDiff of the imaged image is produced, and thus the image of the tracking target can be accurately acquired to update the template image, and the image tracking performance can be enhanced.

Furthermore, according to one embodiment, the similarity threshold value Dth is increased by a predetermined value when the repeatedly calculated minimum difference MinDiff is continuously greater than the similarity threshold value Dth for greater than or equal to a predetermined number of times, and the similarity threshold value Dth is decreased by a predetermined value when the repeatedly calculated minimum difference MinDiff is continuously smaller than the similarity threshold value Dth for greater than or equal to a predetermined number of times, and thus the similarity threshold value Dth can be appropriately changed and the similarity determination between the imaged image and the reference image can be accurately performed. According to the above described embodiment, the values of the predetermined number of times used in the determination of step 206 and step 215 may be set to the same, or the values of the predetermined number of times used in the determination of step 206 and step 215 may be set to be different from each other. The predetermined value Th added in step 208 and the predetermined value Th subtracted in step 217 may be the same or may be different from each other. Moreover, at least one of an upper limit value and a lower limit value of the similarity threshold value Dth may be set in advance.

<Variant According to One Embodiment of the Invention>

In the embodiment described above, an example in which an initial value at which similarity determination can be appropriately carried out in the normal photographing scene is used for the similarity threshold value Dth immediately after the start of the image tracking process has been described, but the minimum difference MinDiff immediately after the start of the image tracking process sometimes greatly deviate from the initial value of the similarity threshold value Dth depending on the photographing scene. In such photographing scene, the similarity threshold value Dth converges to an appropriate value with respect to the minimum difference MinDiff after the similarity threshold value setting process shown in FIG. 10 is repeated over a number of times, and thus the new tracking subject region by image tracking is meanwhile not determined, and update of the template is also not performed.

Figure 12:
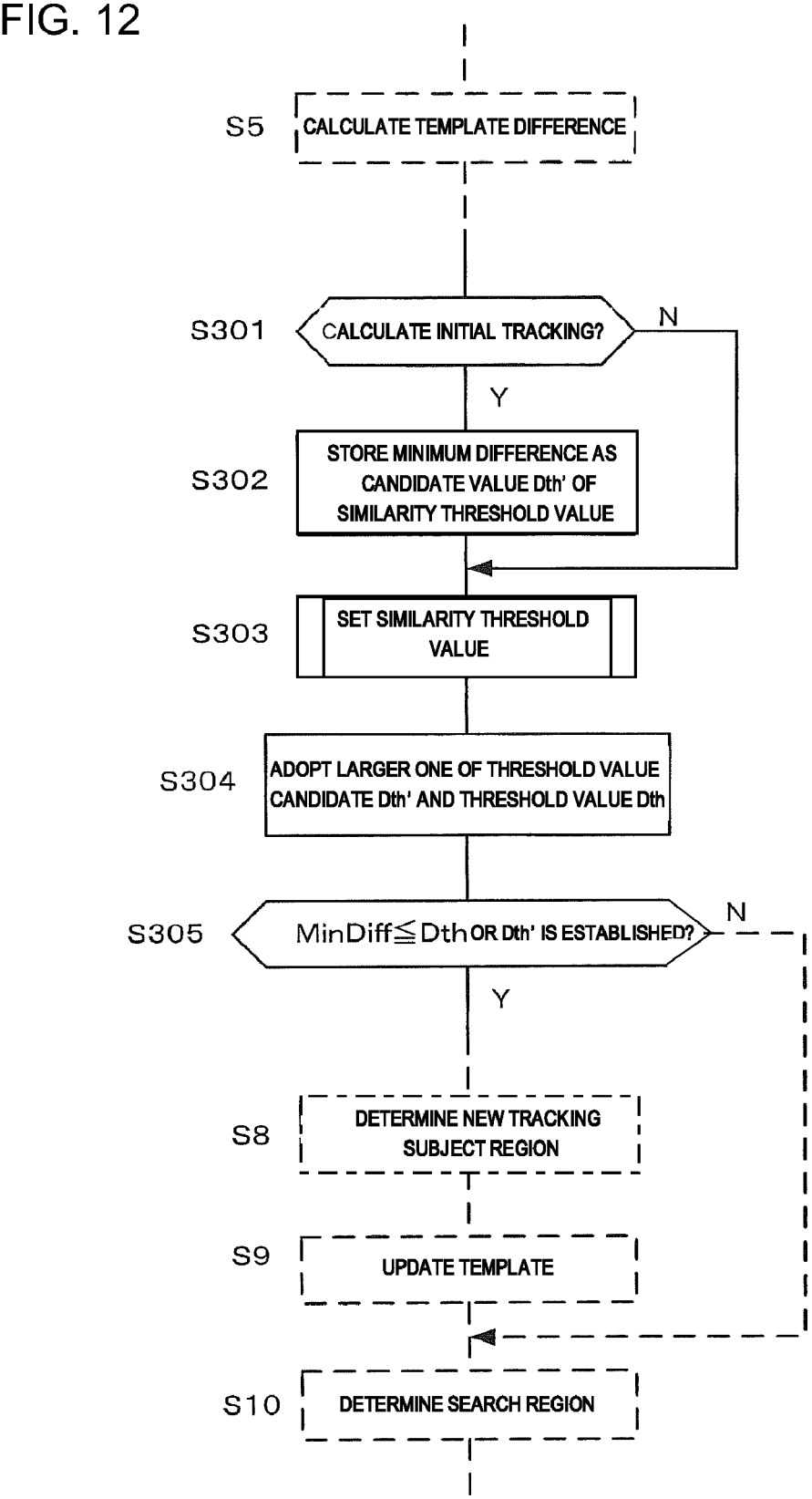
FIG. 12 is a flowchart showing one part of the subject tracking operation of a variant according to the embodiment of the present invention.

In the variant, the minimum difference MinDiff of the image tracking result of the first time, that is, the template difference calculation result in step 5 of the first time is set as a candidate value of the similarity threshold value Dth, and the larger one in the comparison with the initial value of the similarity threshold value Dth is adopted, as shown in FIG. 12. The subject tracking process of the variant shown in FIG. 12 shows only the steps different from the subject tracking process according to one embodiment shown in FIG. 8.

In FIG. 12, whether or not the tracking calculation for this time, that is, the template difference calculation is the calculation of the first time immediately after the start of image tracking is checked in step 301 after performing template difference calculation in step 5. The process proceeds to step 302 only in the case of tracking calculation of the first time, and the minimum difference MinDiff obtained in the template difference calculation of the first time of step 5 is stored in the memory 19*d* as the candidate value Dth' of the similarity threshold value.

In the subsequent step 303, the similarity threshold value setting sub-routine shown in FIG. 10 is executed. In the similarity threshold value setting process, when the minimum difference MinDiff is continuously greater than the similarity threshold value Dth for greater than or equal to a predetermined number of times, the predetermined value Th is added to the similarity threshold value Dth to increase the similarity threshold value Dth, and when the minimum difference MinDiff is continuously smaller than the similarity threshold value Dth for greater than or equal to a predetermined number of times, the predetermined value Th is subtracted from the similarity threshold value Dth to reduce the similarity threshold value Dth.

In step 304, the minimum difference MinDiff of the tracking calculation result of the first time, that is, the candidate value Dth' of the similarity threshold value and the similarity threshold value Dth obtained in the similarity threshold value setting process are compared, and the larger one is adopted as the proper similarity threshold value Dth. In the following step 305, whether or not the minimum difference MinDiff calculated in the template difference calculation of step 5 is smaller than or equal to the properly adopted similarity threshold value Dth, that is, smaller than or equal to the larger value of the candidate value Dth' of the similarity threshold value and the similarity threshold value Dth calculated in the similarity threshold value setting process is determined.

When the minimum difference MinDiff is smaller than or equal to the properly adopted similarity threshold value Dth, the process proceeds to steps 8 and 9, and the new tracking subject region is determined and the template is updated as described above. When the minimum difference MinDiff is greater than the properly adopted similarity threshold value Dth, steps 8 and 9 are skipped, and determination of the new tracking subject region and update of the template are not performed.

When the candidate value Dth' of the similarity threshold value is greater than the similarity threshold value Dth calculated in the similarity threshold value setting process in step 305 immediately after the start of image tracking, determination of MinDiff≦Dth' is affirmed and the process proceeds to steps 8 and 9 since the minimum difference MinDiff is set as the candidate value Dth' of the similarity threshold value, and determination of the new tracking subject region and update of the template are performed.

The difference between the minimum difference MinDiff of the tracking calculation result of the first time, that is, the candidate value Dth' of the similarity threshold value and the similarity threshold value Dth obtained in the similarity threshold value setting process may be calculated, and the process of the variant of FIG. 12 may be performed when such difference (Dth'−Dth) is greater than or equal to a predetermined value.

Figure 13:
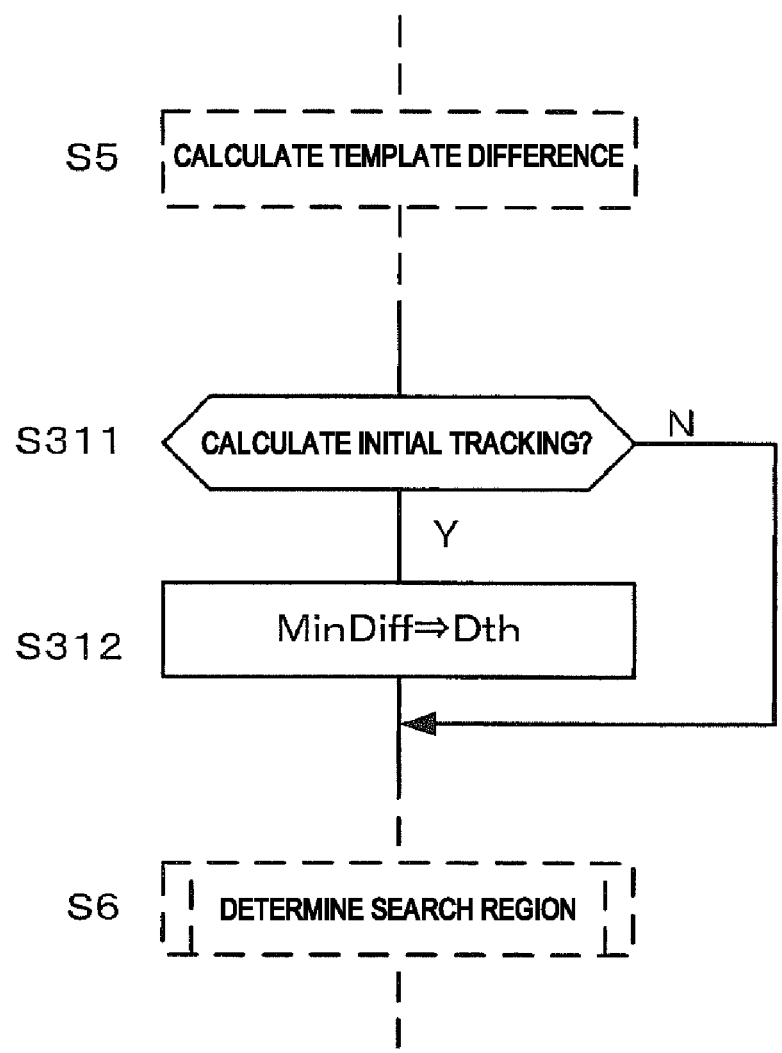
FIG. 13 is a flowchart showing one part of the subject tracking operation of another variant according to the embodiment of the present invention.

Furthermore, as shown in FIG. 13, in place of the initial value of the similarity threshold value Dth, the minimum difference MinDiff of the image tracking result of the first time, that is, the template difference calculation result in step 5 of the first time may be set as the similarity threshold value Dth. In FIG. 13, only the steps different from the subject tracking process according to the embodiment shown in FIG. 8 are shown.

After performing the template difference calculation in step 5 of FIG. 13, whether or not it is the tracking calculation of the first time is determined in step 311, where the process proceeds to step 312 only in the case of the tracking calculation of the first time, and the minimum difference MinDiff of the tracking calculation result of the first time is set as the similarity threshold value Dth. In step 6, the similarity value setting process described above is executed on the similarity threshold value Dth set with the minimum difference MinDiff of the tracking calculation result of the first time.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image recognition device comprising:
   an imaging unit configured to acquire first image information, second image information, and third image information;
   a holding unit configured to hold reference information that functions as a reference image;
   a detection unit connected to the holding unit and configured to detect a first difference between at least a part of the first image information and the reference information, detect a second difference between at least a part of the second image information and the reference information, and detect a third difference between at least a part of the third image information and the reference information;
   a recognition unit connected to the detection unit, configured to make a first determination whether or not the first difference is within a predetermined range, and configured to make a second determination whether or not the second difference is within the predetermined range;
   a changing unit connected to the recognition unit and configured to change the predetermined range based on the first determination, the second determination, the first difference, and the second difference, the changing unit being configured to change the predetermined range based on an average of the first difference and the second difference; and
   the recognition unit being configured to recognize an area corresponding to the reference image in the third image information based on the third difference and the predetermined range which has been changed.

2. The image recognition device according to claim 1, wherein the changing unit is configured to change the predetermined range when the first determination and the second determination are same.

3. The image recognition device according to claim 1, wherein the recognition unit is configured to recognize an area corresponding to the reference image in the third image information based on whether or not the third difference is within the predetermined range which has been changed.

4. The image recognition device according to claim 1, wherein the detection unit is configured to detect plural differences between the reference information and plural parts of the third image information and determine smallest difference among the plural differences as the third difference.

5. The image recognition device according to claim 1, wherein the recognition unit is configured to recognize that an area of the image information in which the first difference is detected corresponds to the reference image when the first difference is within the predetermined range.

6. The image recognition device according to claim 1, further comprising:
   an update unit connected to the detection unit and configured to update the reference information based on image information based on which the first difference is detected when the first difference is determined to be within the predetermined range.

7. The image recognition device according to claim 1, wherein the changing unit is configured to expand the predetermined range when the first determination and the second determination are continuously outside the predetermined range.

8. The image recognition device according to claim 1, wherein the changing unit is configured to narrow the predetermined range when the first determination and the second determination are continuously within the predetermined range.

9. The image recognition device according to claim 1, wherein the changing unit is configured to set the predetermined range using the first difference between the at least a part of the first image information and the reference information.

10. The image recognition device according to claim 9, wherein the changing unit is configured to compare the first difference and an average value of the first difference and the second difference and configured to set the predetermined range based on the comparison.

11. A focus adjustment apparatus comprising:
the image recognition device according to claim 1, the imaging unit being configured to acquire the first image information, the second image information, and the third image information through an optical system;
a focus detection unit configured to detect a focus state of the optical system at a plurality of detection areas provided in a screen of the optical system;
a selection unit connected to the focus detection unit and configured to select at least one of the plurality of detection areas based on a recognition performed by the recognition unit of the image recognition device and a detection performed by the focus detection unit; and
a focus adjustment unit configured to perform focus adjustment of the optical system based on the focus state detected by the focus detection unit with respect to the at least one of the plurality of detection areas selected by the selection unit.

12. The focus adjustment apparatus according to claim 11, wherein the selection unit is configured to select one detection area based on the focus state from the plurality of detection areas contained in the area corresponding to the reference image in the third image information recognized by the recognition unit of the image recognition device.

13. An imaging apparatus comprising the focus adjustment apparatus according to claim 12.

14. An image recognition method comprising:
acquiring first image information, second image information, and third image information;
holding reference information that functions as a reference image;
detecting a first difference between at least a part of the first image information and the reference information;
making a first determination whether or not the first difference is within a predetermined range;
detecting a second difference between at least a part of the second image information and the reference information;
making a second determination whether or not the second difference is within the predetermined range;
changing the predetermined range based on the first determination, the second determination, the first difference, and the second difference;
detecting a third difference between at least a part of the third image information and the reference information; and
recognizing an area corresponding to the reference image in the third image information based on the third difference and the predetermined range which has been changed,
wherein the predetermined range is changed based on an average of the first difference and the second difference.

15. The image recognition method according to claim 14, wherein the predetermined range is changed when the first determination and the second determination are same.

16. The image recognition method according to claim 14, wherein an area corresponding to the reference image in the third image information is recognized based on whether or not the third difference is within the predetermined range which has been changed.

17. The image recognition method according to claim 14, wherein plural differences between the reference information and plural parts of the third image information are detected and smallest difference among the plural differences is determined as the third difference.

18. The image recognition method according to claim 14, wherein an area of the image information in which the first difference is detected is recognized as corresponding to the reference image when the first difference is within the predetermined range.

19. The image recognition method according to claim 14, wherein, when the first difference is determined to be within the predetermined range, the reference information is updated based on at least a part of the first image information in which the first difference is detected.

20. The image recognition method according to claim 14, wherein the predetermined range is expanded when the first determination and the second determination are continuously outside the predetermined range.

21. The image recognition method according to claim 14, wherein the predetermined range is narrowed when the first determination and the second determination are continuously within the predetermined range.

22. The image recognition method according to claim 14, wherein the predetermined range is set using the first difference between the at least a part of the first image information and the reference information.

23. The image recognition method according to claim 22, wherein the first difference and an average value of the first difference and the second difference are compared and the predetermined range is set based on the comparison.

24. A focus adjustment method comprising:
performing the image recognition method according to claim 14;
acquiring the first image information, the second image information, and the third image information through an optical system;
detecting a focus state of the optical system at a plurality of detection areas provided in a screen of the optical system;
selecting at least one detection area among the plurality of detection areas based on the focus state and the area recognized as corresponding to the reference image; and
performing focus adjustment of the optical system based on the focus state of the at least one detection area.

25. The focus adjustment method according to claim 24, wherein the at least one detection area is selected based on the focus state of detection area contained in the area recognized as corresponding to the reference image in the third image information.

* * * * *